(12) United States Patent
Rakshit et al.

(10) Patent No.: US 11,310,296 B2
(45) Date of Patent: Apr. 19, 2022

(54) COGNITIVE CONTENT MULTICASTING BASED ON USER ATTENTIVENESS

(71) Applicant: International Business Machines Corporation, Armonk, NY (US)

(72) Inventors: Sarbajit K. Rakshit, Kolkata (IN); Martin G. Keen, Cary, NC (US); James E Bostick, Cedar Park, TX (US); John M. Ganci, Jr., Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 113 days.

(21) Appl. No.: 16/182,135

(22) Filed: Nov. 6, 2018

(65) Prior Publication Data

US 2020/0145468 A1 May 7, 2020

(51) Int. Cl.
*H04L 65/611* (2022.01)
*H04N 21/442* (2011.01)
*H04L 67/52* (2022.01)

(52) U.S. Cl.
CPC .......... *H04L 65/4076* (2013.01); *H04L 67/18* (2013.01); *H04N 21/44218* (2013.01); *H04N 21/44224* (2020.08)

(58) Field of Classification Search
CPC ................ H04L 65/4076; H04L 67/18; H04N 21/44218; H04N 21/4126
See application file for complete search history.

(56) References Cited

U.S. PATENT DOCUMENTS

| 5,488,385 | A | 1/1996 | Singhal et al. | |
|---|---|---|---|---|
| 6,766,524 | B1 | 7/2004 | Matheny et al. | |
| 8,484,676 | B1 * | 7/2013 | Narsimhan | ........ H04N 21/4325 725/23 |
| 8,689,250 | B2 * | 4/2014 | Bhide | ................ H04N 21/4542 725/40 |
| 9,009,339 | B2 * | 4/2015 | Landow | ............ H04N 21/8133 709/219 |
| 9,077,458 | B2 * | 7/2015 | Burger | .................. H04H 60/33 |
| 9,215,490 | B2 * | 12/2015 | Won | .................... H04N 21/4325 |

(Continued)

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.

*Primary Examiner* — William G Trost, IV
*Assistant Examiner* — Abdelbasst Talioua
(74) *Attorney, Agent, or Firm* — Randy Emilio Tejeda; George S. Blasiak; Heslin Rothenberg Farley & Mesiti PC

(57) ABSTRACT

Methods, computer program products, and systems are presented. The methods include, for instance: identifying a user and a mobile device registered for the user in a user profile in a viewing area for a streaming content by a stationary device. The viewing behavior of the user is monitored and multicasting onto the mobile device is determined based on a class of the streaming content, an attentiveness score of the user, and a multicasting threshold condition on the attentiveness score. A mobile streaming content including a display configuration is generated and sent to the mobile device for multicasting, upon detecting a triggering event for multicasting on the user in relation with the mobile device.

20 Claims, 7 Drawing Sheets

(56) References Cited

U.S. PATENT DOCUMENTS

| | | | |
|---|---|---|---|
| 9,326,189 B2* | 4/2016 | Luna | H04W 28/06 |
| 9,591,071 B2* | 3/2017 | Goldstein | H04L 65/60 |
| 9,693,097 B2* | 6/2017 | Meredith | H04N 21/4415 |
| 10,299,001 B2* | 5/2019 | Sidi | H04N 21/4667 |
| 10,394,317 B2* | 8/2019 | Hardee | G06F 3/017 |
| 10,425,687 B1* | 9/2019 | Karnezos | H04N 21/42201 |
| 2007/0265073 A1* | 11/2007 | Novi | H04N 21/472 463/35 |
| 2010/0211439 A1* | 8/2010 | Marci | H04N 21/42201 705/7.29 |
| 2010/0222102 A1* | 9/2010 | Rodriguez | H04N 21/41265 715/764 |
| 2011/0145871 A1* | 6/2011 | Lee | H04N 21/6405 725/98 |
| 2011/0320627 A1* | 12/2011 | Landow | H04N 21/47202 709/231 |
| 2013/0147686 A1* | 6/2013 | Clavin | G02B 27/017 345/8 |
| 2013/0159876 A1* | 6/2013 | Narasimhan | H04N 21/6547 715/752 |
| 2013/0176415 A1* | 7/2013 | Kim | H04N 5/23219 348/78 |
| 2013/0300759 A1* | 11/2013 | White | G06F 3/013 345/589 |
| 2014/0071342 A1* | 3/2014 | Winograd | H04N 21/4363 348/383 |
| 2014/0074588 A1* | 3/2014 | Bertsch | G06Q 30/02 705/14.42 |
| 2014/0098116 A1* | 4/2014 | Baldwin | G06F 3/013 345/522 |
| 2014/0143043 A1* | 5/2014 | Wickramasuriya | H04N 21/41407 705/14.45 |
| 2014/0150002 A1* | 5/2014 | Hough | H04N 21/4532 725/9 |
| 2014/0181910 A1* | 6/2014 | Fingal | H04L 63/107 726/4 |
| 2014/0259067 A1* | 9/2014 | Yao | H04N 21/4263 725/39 |
| 2014/0372620 A1* | 12/2014 | Vedula | H04L 67/14 709/228 |
| 2015/0086174 A1* | 3/2015 | Abecassis | H04N 21/4122 386/201 |
| 2015/0112796 A1* | 4/2015 | Greenzeiger | G06Q 30/0251 705/14.49 |
| 2015/0156249 A1* | 6/2015 | Draznin | H04L 12/1895 709/204 |
| 2015/0193785 A1* | 7/2015 | Besehanic | G06Q 30/0201 705/7.32 |
| 2016/0105700 A1* | 4/2016 | Collins | H04N 21/8186 725/14 |
| 2016/0275833 A1* | 9/2016 | Forbes | H04N 21/4667 |
| 2016/0323643 A1* | 11/2016 | Panchaksharaiah | H04N 21/4753 |
| 2016/0323863 A1* | 11/2016 | Park | H04W 4/023 |
| 2016/0366454 A1* | 12/2016 | Tatourian | G06F 3/14 |
| 2017/0019439 A1* | 1/2017 | Kim | H04L 65/4084 |
| 2017/0060518 A1* | 3/2017 | Hong | G06F 3/1423 |
| 2017/0085657 A1* | 3/2017 | Bostick | H04W 4/21 |
| 2017/0171620 A1* | 6/2017 | Oren | H04N 21/6582 |
| 2017/0214733 A1* | 7/2017 | Abu | H04L 67/10 |
| 2017/0344253 A1* | 11/2017 | Zhang | H04M 1/7243 |
| 2018/0124438 A1* | 5/2018 | Barnett | H04N 21/4826 |
| 2018/0146198 A1* | 5/2018 | Atluru | G06V 20/41 |
| 2018/0205985 A1* | 7/2018 | Boudreau | H04N 21/44218 |
| 2018/0218400 A1* | 8/2018 | Kerns | G06Q 30/0256 |
| 2018/0218725 A1* | 8/2018 | Korbecki | G10L 13/00 |
| 2018/0249213 A1* | 8/2018 | Bostick | H04N 21/4532 |
| 2018/0268221 A1* | 9/2018 | Bostick | G06V 40/174 |
| 2018/0324490 A1* | 11/2018 | Anderson | H04N 21/42201 |
| 2019/0289354 A1* | 9/2019 | Garcia | G06F 16/532 |
| 2019/0333221 A1* | 10/2019 | Nakagomi | G06T 7/337 |
| 2019/0356964 A1* | 11/2019 | Tillman, Jr. | H04N 21/4415 |
| 2020/0145717 A1* | 5/2020 | Shah | H04N 21/6543 |

* cited by examiner

COGNITIVE CONTENT MULTICASTING BASED ON USER ATTENTIVENESS

TECHNICAL FIELD

The present disclosure relates to content streaming technology, and more particularly to methods, computer program products, and systems for cognitive multicasting of the content.

BACKGROUND

With increased availability of electronic devices capable of displaying streaming content, it is often the case a person who is watching a certain streaming content has access to multiple display devices. People often carry a mobile device, such as a smartphone, that can also display the same streaming content as any stationary multimedia device, such as a big screen TV. In such environments, people use their mobile devices quite frequently to receive a call, to respond to a text message, to search the Internet, or to use their favorite apps for various purposes, either on their own volition or as being notified, while they are watching a streaming content on stationary devices.

SUMMARY

The shortcomings of the prior art are overcome, and additional advantages are provided, through the provision, in one aspect, of a method. The method includes, for instance: identifying, by one or more processor, a user and one or more mobile device registered for the user in a user profile, where the user is in a viewing area of a stationary device playing a streaming content; monitoring, by the one or more processor, viewing behavior of the user; determining, by the one or more processor, to multicast the streaming content to a mobile device of the one or more mobile device, based on a class of the streaming content, an attentiveness score of the user, and a multicasting threshold condition on the attentiveness score, where the attentiveness score of the user quantifies how attentive the user is in viewing the streaming content; rendering, by the one or more processor, a mobile streaming content by combining a display configuration and the streaming content, upon detecting a triggering event for multicasting on the user and the mobile device; and multicasting, by the one or more processor, the mobile streaming content to the mobile device for the user, simultaneously with sending the streaming content to the stationary device.

Additional features are realized through the techniques set forth herein. Other embodiments and aspects, including but not limited to computer program products and systems, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
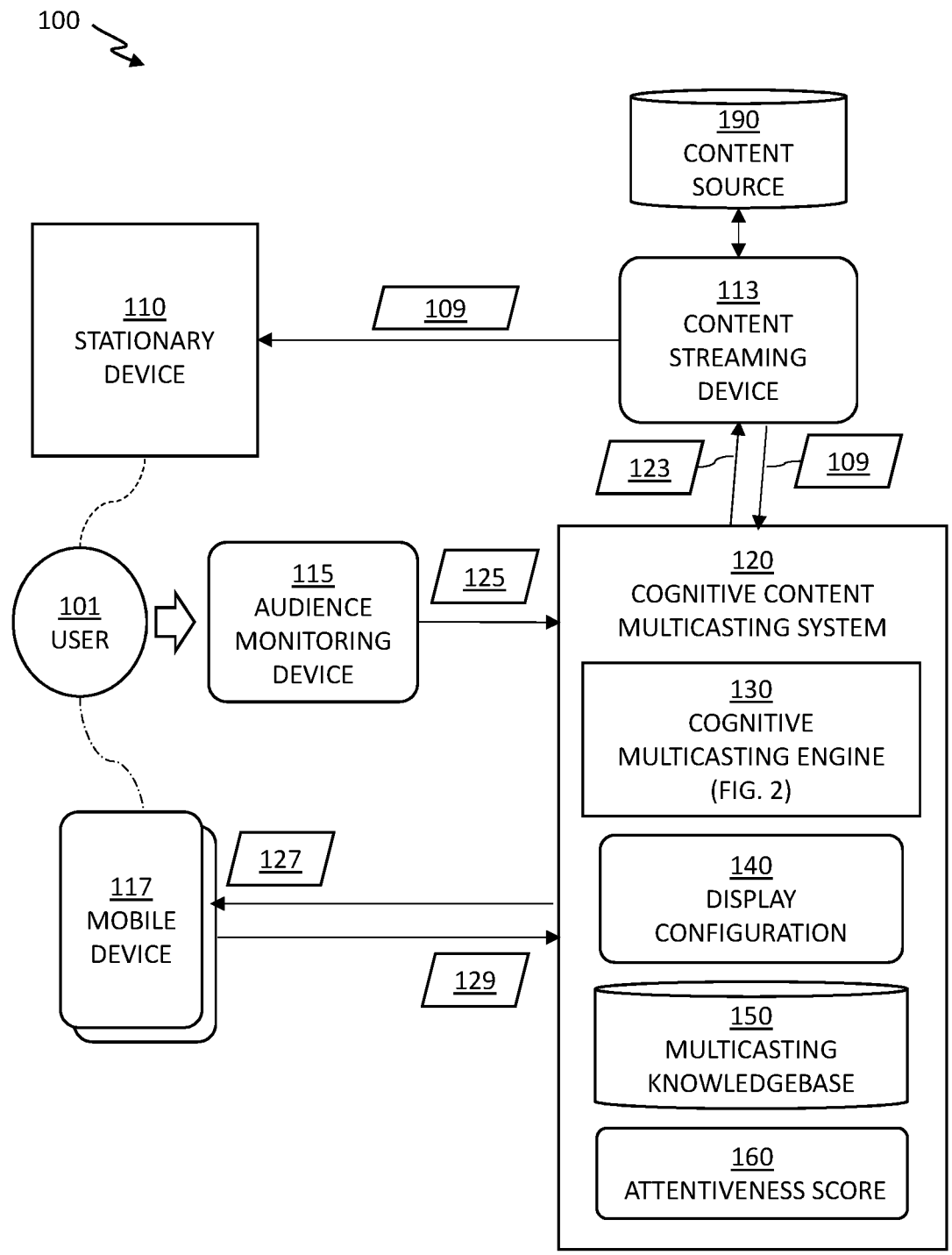
FIG. 1 depicts a system for cognitive content multicasting based on user attentiveness, in accordance with one or more embodiments set forth herein.

FIG. 1 depicts a system 100 for cognitive content multicasting based on user attentiveness, in accordance with one or more embodiments set forth herein.

The system 100 includes a stationary device 110, a content streaming device 113, an audience monitoring device 115, and a cognitive content multicasting system 120. Initially, a user 101 watches streaming content 109 on the stationary device 110. The stationary device 110 is not mobile in nature, as indicated by the term, and installed at a certain location, and provides both audio and video of the streaming content 109 to users in a viewing area of the stationary device 110. Examples of the stationary device 110 include, but are not limited to, a television, a monitor, a projector and a screen, combined with a sound system if necessary, or any other combinations of audiovisual equipment that can reproduce the streaming content 109. In this specification, the terms "display", "play", or any similar term, are used to indicate reproduction of both audio and video of a certain multimedia content, unless specifically addressed for only the video portion of multimedia content.

The content streaming device 113 receives the streaming content 109 originating from a content source 190 coupled across the Internet or any other communication networks in a continuous manner, and simultaneously provides the received streaming content 109 to the stationary device 110 to be played, via a local communication channel, including, but not limited to, a local network around the viewing area such as Wired/Wireless local area network (LAN). The content streaming device 113 continuously accesses the content source 190 via a certain communication network such as the Internet, to receive the streaming content 109. Examples of the content source 190 include, but are not limited to, public/cable television broadcasting companies, on-demand streaming service providers, and any type of content providing entities.

While streaming the streaming content 109 to the stationary device 110, the content streaming device 113 also continuously interacts with the cognitive content multicasting system 120 in order to have the streaming content 109 analyzed for multicasting. The cognitive content multicasting system 120 sends control data 123 to the content streaming device 113, which demands the content streaming device 113 to send a preconfigured portion of the streaming content 109 for classification.

Embodiments of the present invention recognize that to stream a certain media content is to continuously receive and to simultaneously reproduce and/or transfer the received media content with only buffering instead of downloading the media content in its entirety prior to such reproduction and/or transfer. Embodiments of the present invention recognize that conventional content streaming devices stream the streaming content 109 to the stationary device 110 from the content sources 190, and that various streaming technologies are known and available. Embodiments of the present invention also recognize that certain types of stationary devices 110, often referred to as a smart TV, includes programmable streaming applications that can stream from specific sources including the content source 190 on the Internet, and consequently, perform functionalities of both the stationary device 110 and the content streaming device 113 of FIG. 1. Embodiments of the present invention also recognize that certain types of mobile devices 117 such as $4^{th}$ generation (4G) smartphones with Wi-Fi Direct support, can stream from sources, including the content source 190 on the Internet, and to the stationary device 110, by which perform functionalities of both the mobile device 117 and the content streaming device 113 of FIG. 1. Accordingly, in the present specification, the term "device" as used in the stationary device 110, the content streaming device 113, the audience monitoring device 115, and the mobile device 117 indicates respective functional components rather than physically separated pieces of machinery.

The audience monitoring device 115 monitors behavior of the user 101, particularly on how much attention the user 101 pays to the streaming content 109. The audience monitoring device 115 generates viewing behavior data 125 by capturing preconfigured data points and sends the viewing behavior data 125 to the cognitive content multicasting system 120.

In certain embodiment of the present invention, the audience monitoring device 115 is implemented by a camera toward the viewing area of the stationary device 110 in order to capture viewing behavior of members of the audience. For example, the audience monitoring device 115 is configured to capture visual characteristics of the viewing behavior of the user 101, including the direction of the face of the user 101, eye movements and gaze of the user 101, movements in the hands and/or mouths of the user 101, and/or a presence of the user 101 in the viewing area of the stationary device 110, etc. The audience monitoring device 115 sends the captured viewing behavior data 125 to the cognitive content multicasting system 120, for attentiveness analysis, also referred to as multicasting analysis.

In other embodiments of the present invention, the audience monitoring device 115 is implemented with a camera and a microphone, in order to monitor audiovisual characteristics of the viewing behavior of the user 101, including a prolonged speech by the user 101, ambient sound/noise level indicating any ongoing conversation from a speaker outside of the monitored viewing area of the stationary device 110, in addition to all the aforementioned visual characteristics of the viewing behavior of the user 101.

The audience monitoring device 115 can also be implemented with a Global Positioning System (GPS) locator on the mobile device 117 of the user 101, in order to monitor how the user 101 moves in and out of the viewing area of the stationary device 110. The audience monitoring device 115 can be configured for a specific monitoring interval and/or for continuous monitoring based on the user preference, a class or other characteristics of the streaming content 109, etc. Accordingly, depending on the monitoring specification and intervals, the viewing behavior data 125 can be a data stream or a series of still images periodically sampled according to the predefined monitoring interval.

In certain embodiments of the present invention, the cognitive content multicasting system 120 specifies the viewing area of the stationary device 110 in terms of a visible range and an audible range, such that the audience monitoring device 115 distinguishes the viewing behavior data 125 as to if the user 101 can see and hear the streaming content 109, if the user 101 can only see the streaming content 109 without the audio portion of the streaming content 109, or if the user 101 can only hear the streaming content 109 without the video portion of the streaming content 109.

The user 101 carries one or more mobile device 117 that is associated with the user 101 in the cognitive content multicasting system 120. The one or more mobile device 117 is registered for the user 101 in the cognitive content multicasting system 120. Examples of the mobile device 117 include, but are not limited to, a smart phone, a tablet, and a laptop. For the purpose of the cognitive multicasting of the streaming content 109, the mobile device 117 in this specification refers to the types of mobile devices that can reproduce both audio and video of the streaming content 109.

The mobile device 117 sends device status data 127 to the cognitive content multicasting system 120 and receives mobile streaming content 129 for display if the streaming content 109 is determined for multicasting. The mobile device 117 is registered for the user 101 and had previously received a request to report the device status data 127 to facilitate multicasting of the streaming content 109 from the cognitive content multicasting system 120. The device status data 127 include, but are not limited to, a location of the mobile device 117, a list of active applications with which the user 101 presently interacts, any incoming messages/notifications for the user 101, and display specifications of the mobile device 117.

It should be noted that the components of the stationary device 110, the content streaming device 113, the audience monitoring device 115, the one or more mobile device 117, and the cognitive content multicasting system 120 denote respective functionalities rather than distinctive physically separated pieces of machinery. Accordingly, any combination of the components 110, 113, 115, 117, and 120 can be integrated into a single piece of machinery. Depending on the manner of implementation, the components 110, 113, 115, 117, and 120 communicate with one another via some form of network including a wired LAN, a wireless LAN (Wi-Fi), a Bluetooth connection, when implemented with separate physical devices, or across a direct wire/shared bus connection or any type of inter-device communication path within a physical device, or combinations thereof, according to the implementation of respective functional components.

In certain embodiments of the present invention, the individual members can be detected and identified by use of respective mobile devices registered for each user in the cognitive content multicasting system 120, by use of, for example, radio detection and identification of the mobile device 117. In other embodiments of the present invention, the cognitive content multicasting system 120 utilizes data from the audience monitoring device 115 for user detection and identification, by use of external image recognition tools.

In certain embodiments of the present invention, the stationary device 110, the content streaming device 113, the audience monitoring device 115, and the cognitive content multicasting system 120, and any combinations thereof, can be implemented as respective components of an integrated device for the system 100 for cognitive content multicasting.

The cognitive content multicasting system 120 includes a cognitive multicasting engine 130, one or more display configuration 140, and a multicasting knowledgebase 150. The cognitive multicasting engine 130 assesses an attentiveness score 160 based on the combination of the viewing behavior data 125 and mobile device activities of the user 101 as represented in the device status data 127. The cognitive content multicasting system 120 can further utilize external cognitive analytics tools and external image recognition tools for certain functionalities of the cognitive content multicasting system 120. Embodiments of the present invention recognize that conventional video classification methods and image recognition techniques as performed by the external cognitive analytics tools can be utilized by the cognitive multicasting engine 130 without affecting the scope of the present invention. The associations between certain content classes and the decision whether or not to multicast the respective subject content classes are not within the conventional video classification as performed by the cognitive multicasting engine 130.

The cognitive multicasting engine 130 detects and identifies the user 101, and obtains the viewing behavior data 125 from the audience monitoring device 115. The cognitive multicasting engine 130 analyzes and classifies the streaming content 109, and, if the streaming content 109 is of a class for multicasting, then assesses attentiveness of the user 101 to the streaming content 109. The attentiveness is represented as the attentiveness score 160. The cognitive multicasting engine 130 determines whether or not to multicast the streaming content 109 to the mobile device 117 for the user 101 based on both the attentiveness score 160 of the user 101 to the streaming content 109 and the class of the streaming content 109. The cognitive multicasting engine 130 further determines how to render the mobile streaming content 129, referred to as the display configuration 140, based on various aspects of the viewing including, but not limited to, the attentiveness of the user 101 on the streaming content 109, the user activity on the mobile device 117, and preference settings on displays as set in the user profile.

In certain embodiments of the present invention, the cognitive multicasting engine 130 quantifies the attentiveness score 101 for the user 101 as a predetermined range of numbers, for example an integer from [0 . . . 9], wherein zero (0) indicates the lowest attentiveness score 160 and nine (9) indicates the highest attentiveness score 160. In certain embodiments of the present invention, the cognitive multicasting engine 130 assesses the attentiveness score 101 of the user 101 as a set of predetermined levels, for example, {Low, Med, High}, which indicate a low, a medium, and a high attentiveness score 160, respectively.

For the streaming content 109 that is determined to be multicasted, the cognitive multicasting engine 130 produces the mobile streaming content 129 according to the display configuration 140 for the streaming content 109, and begins multicasting the mobile streaming content 129 to the mobile device 117 corresponding to the user 101. The content streaming device 113 continuously displays the streaming content 109 on the stationary device 110, regardless of whether or not the cognitive content multicasting system 120 multicasts the mobile streaming content 129 on the mobile device 117. In other embodiments of the present invention, the cognitive content multicasting system 120 can notify the content streaming device 113 to stop displaying the streaming content 109 on the stationary device 110, if no member of the audience is left in the viewing area of the stationary device 110. Detailed operations of the cognitive multicasting engine 130 are described in FIG. 2 and corresponding description.

In certain embodiments of the present invention, the control data 123 can specify a certain portion of the streaming content 109 to receive for analysis to determine whether or not to multicast the streaming content 109, instead of receiving the streaming content 109 as a whole. Examples of the portion of the streaming content 109 that can be specified by the cognitive content multicasting system 120 include, but not limited to, the metadata of the streaming content 109, still images of the streaming content 109 sampled every period specified in the control data 123 for content classification. Once the cognitive content multicasting system 120 determines to multicast the streaming content 109 to the mobile device 117, then the cognitive multicasting engine 130 can adjust the control data 123 to send the streaming content 109 to produce the mobile streaming content 129 for multicasting.

The one or more display configuration 140 specifies how to display the streaming content 109 on the mobile device 117 as being multicasted by the cognitive content multicasting system 120. The cognitive multicasting engine 130 renders the mobile streaming content 129 based on one of the display configuration 140 corresponding to a combination of the device status data 127 and the attentiveness score 160 of the user 101 on the streaming content 109 while being displayed on the stationary device 110, as represented in the viewing behavior data 125.

In certain embodiments of the present invention, one exemplary instance of the display configuration 140 indicates that the mobile streaming content 129 is a full screen display of the streaming content 109 on the mobile device 117 with no interference, if the user 101 moves out of the viewing area of the stationary device 110 without using any app on the mobile device 117 while attentively watching the streaming content 109 that is classified as multicast-enabled. In the same embodiment, another display configuration 140 indicates that the mobile streaming content 129 is to be a half-screen display on the mobile device 117 if the user 101 swipes the screen, or uses an app on the mobile device 117 under the same circumstances. In the same embodiment, still another display configuration 140 indicates that the screen space on the mobile device 117 allocated for the mobile streaming content 129 differs according to various apps that is used at the moment of multicasting. In the same embodiment, still another display configuration 140 indicates that the mobile streaming content 129 is to be a full screen display on the mobile device 117 with overlaid text display or a ticker in some portion of the screen of the mobile device 117, if the user 101 is using a particular app configured for overlaid text.

In the same embodiment of the present invention as above where the viewing area is specified in terms of the visible range and the audible range, the display configuration 140 is to respectively specify whether or not to multicast video portion and audio portion of the streaming content 109, according to visibility and audibility on the audio and video of the streaming content 109 from the stationary device 110 by the user 101. For example, if the user 101 is out of the visible range but within the audible range, then the display configuration 140 specifies that the mobile streaming content 129 includes only the video portion of the streaming content 109.

The multicasting knowledgebase 150 of the cognitive content multicasting system 120 stores various information useful to determine a class of the streaming content 109 for multicasting purposes and/or to determine a certain level of attentiveness optimal for multicasting. Examples of the information stored in the multicasting knowledgebase 150 include, but are not limited to, knowledge from public domain or from feedbacks by users of the cognitive content multicasting system 120 regarding: user preferences on various classes of streaming contents; relationships between attentiveness and enjoyment; relationships between various activities on mobile devices and the levels of distraction; and combinations thereof. The multicasting knowledgebase 150 further include proprietary knowledge accumulated from operating the cognitive content multicasting system 120, including but not limited to, custom content classification based on user feedbacks on both various mobile streaming contents with corresponding display configurations and past streaming contents that had not been multicasted on the mobile devices. For example, the multicasting knowledgebase 150 include multiple feedbacks, user preferences, and media studies that users walk about or otherwise do not pay much attention to the streaming content 109 during commercial messages in the streaming content 109. Accordingly, the cognitive multicasting engine 130 can classify commercial messages in the streaming content 109 as a no-multicast class, unless specifically requested by the user 101. By use of the multicasting knowledgebase 150, the cognitive multicasting engine 130 classifies the streaming content 109 more efficiently in a customized manner based on minimal portion of the streaming content 109, and accumulates knowledge on the optimal threshold level of attentiveness for multicasting.

In certain embodiments of the present invention, the multicasting knowledgebase 150 includes certain custom multicasting information for respective members of the audience, which includes, but is not limited to, user profile corresponding to each user 101, including identity, associated mobile devices, multicasting preferences for respective mobile devices, multicasting preferences for respective mobile device app activities, and/or multicasting preferences for analog activities, multicasting directive on moving out of the viewing area by the user 101, and distinction in multicasting decision between the visible range and the audible range from the stationary device 110. The user profiles and preferences can be stored in a separate repository from the multicasting knowledgebase 150 in the cognitive content multicasting system 120.

Embodiments of the present invention monitor and analyze viewing behavior of individual members of the audience. User attentiveness is quantified as an attentiveness score 160 and associated with a class of the streaming content 109 that the audiences are watching. According to the combined result of both the class of the streaming content 109 and the attentive score as being demonstrated on the user 101, the cognitive multicasting engine 130 determines whether or not to multicast the streaming content 109 to the mobile device 117 upon detecting a triggering event for multicasting. The triggering event for multicasting, simply referred to as the triggering event in this specification, indicates a change of viewing behavior on the user 101 involving the mobile device 117 or a change in location of the user 101 in and out of the viewing area of the stationary device 110.

The cognitive multicasting engine 120 identifies individual users and applies multicasting preferences preconfigured for respective users in determining whether or not to multicast the streaming content 109, and in rendering the mobile streaming content 129 if the streaming content 109 is to be multicasted. Accordingly, the embodiments of the present invention facilitate that the user 101 can watch the streaming content 109 seamlessly on the mobile device 117 even though the user 101 is interrupted by various notices, messages, and any activities on the mobile device 117, or even if the user 101 needs to leave the viewing area of the stationary device 110.

The cognitive multicasting engine 120 subsequently renders the mobile streaming content 129 from the streaming content 109 based on the attentiveness score 160, the content class, and the type of activity on the mobile device 117, and streams to the mobile device 117 such that the user 101 can still enjoy the streaming content 109 by watching the mobile streaming content 129 on the mobile device 117 away from the viewing area of the stationary device 110 or while using the mobile device 117. Embodiments of the present invention provide a user interface to specify user preference for multicasting and how to render the mobile streaming content 129. In certain embodiments of the present invention, the user interface can further facilitate moving, turning off, or resizing the multicasted mobile streaming content 129, while other embodiments would use device setting of the mobile device 117 for presentation of the mobile streaming content 129. Embodiments of the present invention would increase viewing pleasure of the user 101 by adapting the streaming content 109 to a certain pattern in viewing behavior of the user 101. Embodiments of the present invention also prevent unwanted interruption on the continuous viewing by facilitating multitasking of performing activities on the mobile device 117 and watching the streaming content 109, as being rendered to the mobile streaming content 129, while looking at the same screen on the mobile device 117. Accordingly, embodiments of the present invention reduce distraction in multitasking as well as provide a substitute view of the streaming content 109 with the mobile streaming content 129 when the user 101 should leave the viewing area of the stationary device 110.

Embodiments of the present invention can be implemented as a cognitive audiovisual equipment suite that can monitor and analyze user attentiveness, perform content analysis and classification, and multicast streaming content to various remote devices according to results of the analysis. Embodiments of the present invention can be implemented as a component of an application suite of a cognitive system, or as an enhanced feature of conventional streaming devices, or as an enhanced feature by various streaming provides, which mostly stream from mobile devices to stationary devices in order to facilitate enjoyment of the same content by more people on a more capable equipment with respect to audiovisual quality of the play.

Figure 2:
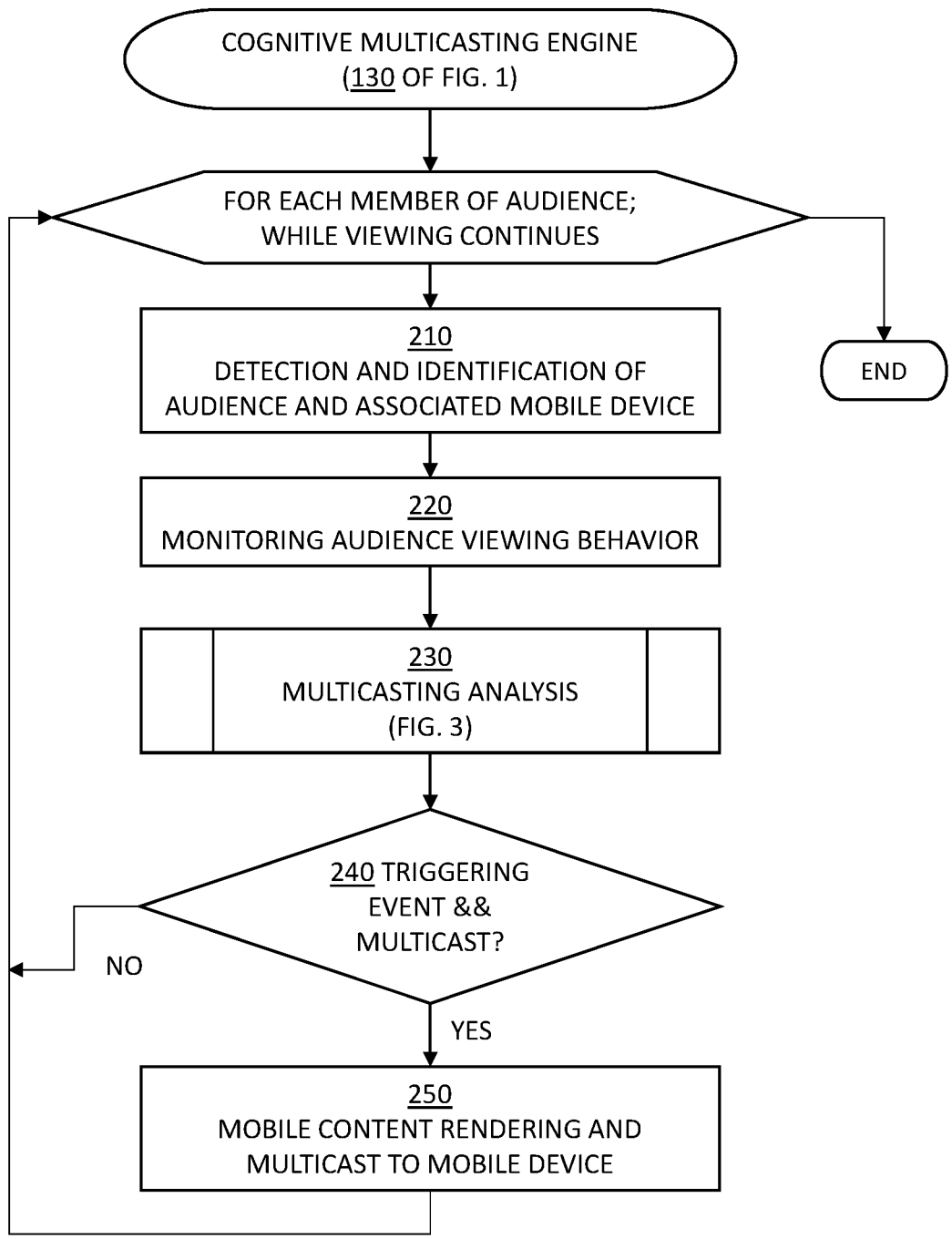
FIG. 2 depicts a flowchart of operations performed by the cognitive multicasting engine, in accordance with one or more embodiments set forth herein.

FIG. 2 depicts a flowchart of operations performed by the cognitive multicasting engine 130, in accordance with one or more embodiments set forth herein.

The cognitive multicasting engine 130 performs blocks 210 through 250 for each member of the audience in the viewing area while viewing on the stationary device 110 continues. The cognitive multicasting engine 130 can be preconfigured to monitor the audience continuously, only on a certain time period, on certain days, for a particular programs, for a particular group of users, and any other combinations of such aspects when appropriate.

In block 210, the cognitive multicasting engine 130 detects the audience in the viewing area of the stationary device 110 watching the streaming content 109 on the stationary device 110 and identifies individual members of the audience. The cognitive multicasting engine 130 also identifies one or more mobile device 117 associated with each identified user 101. Then, the cognitive multicasting engine 130 proceeds with block 220.

In certain embodiments of the present invention, the cognitive content multicasting engine 130 detects and identifies the user 101 based on facial image analysis on the viewing behavior data 125 from the audience monitoring device 115, by use of external image recognition tools on facial images. In the same embodiment, the user profile includes individual facial features of the user 101 for identification as well as one or more mobile device 117 associated with the user 101. In certain embodiments of the present invention, the cognitive multicasting engine 130 detects and identifies the user 101 by use of detecting and identifying one or more mobile device 117 previously registered for the user 101 in the cognitive content multicasting system 120. In certain embodiments of the present invention the cognitive multicasting engine 130 detects and identifies the user 101 by use of a combined method of mobile device detection and facial recognition.

In certain embodiments of the present invention, the cognitive content multicasting engine 130 sends out a request to all mobile devices 117 registered for the user 101, subsequent to identifying the user 101. The request indicates that the mobile devices 117 to report usage and/or location of the mobile device 117 to facilitate the multicasting for the duration of the streaming content 109.

In block 220, the cognitive multicasting engine 130 monitors viewing behavior of the user 101 who is identified in block 210, by analyzing the viewing behavior data 125 as obtained from the audience monitoring device 115. Then, the cognitive multicasting engine 130 proceeds with block 230.

In certain embodiments of the present invention, the audience monitoring device 115 is implemented with a camera directed toward the viewing area of the stationary device 110, which sends the viewing behavior data 125 including facial images of the user 101, as being continuously or a periodically sampled, according to predefined parameters of the audience monitoring device 115. As noted in FIG. 1, the audience monitoring device 115 can be embedded in the stationary device 110 for combined functionalities, or mounted on or near the stationary device 110. As the user 101 will face the stationary device 110, facing the audience monitoring device 115 to the same direction as the screen of the stationary device 110 would increase effectiveness of monitoring without blind spots. In other embodiments of the present invention, the cognitive content multicasting system 120 controls how often the viewing behavior data 125 to be sampled by configuring the audience monitoring device 115.

In certain embodiments of the present invention, the cognitive multicasting engine 130 assesses the level of attentiveness of the user 101 to the streaming content 109 by analyzing the viewing behavior data 125, particularly by tracking eye movement and gaze of the user 101 on the screen of the stationary device 110. By tracking eye movement of the user 101, the cognitive multicasting engine 130 can assess how attentive the user 101 is to the streaming content 109 and quantify the level of attentiveness to an attentiveness score 160. In the same embodiments, the attentiveness score 160 is represented as a number selected from a predetermined range of numbers representing a scale, for example an integer from [0 . . . 9], where one (1) indicates the lowest level of attentiveness and nine (9) indicates the highest level of attentiveness. In other embodiments, the attentiveness score 160 is associated with a level selected from a predetermined set of levels, for example, {Low, Med, High}, which respectively indicate a low, medium, and high levels of the attentiveness scale, respectively.

In the same embodiments where the cognitive multicasting engine 130 assesses the attentiveness score 160 for the user 101, the cognitive multicasting engine 130 can also have a multicasting threshold value, which sets a boundary of the attentiveness score 160 in later determining whether or not to multicast the streaming content. In the same embodiment, the cognitive multicasting engine 130 can also have certain override conditions that is defined in the user profile such that the cognitive multicasting engine 130 adjust the attentiveness score 160 to enable multicasting of the streaming content 109 of certain pre-designated characteristics to the mobile device 117 of the user 101 where a certain aspect of the viewing behavior and/or mobile device activities monitored on the user 101 triggers the override conditions. The override conditions for multicasting can also be specified for certain locations of the user 101 that is not within the viewing area, in order to disable the multicasting by adjusting the attentiveness score 160 to another value less than the multicasting threshold such that the user 101 simply stops multicasting by walking into a certain predefined area as customized in the user preference on multicasting.

In certain embodiments of the present invention, the cognitive multicasting engine 130 assesses the attentiveness score 160 based on various types of image analysis other than facial directions and eye movements, such as hand gestures, ambulatory movements within the viewing area. The cognitive multicasting engine 130 can specify a certain image to result in a high attentiveness score 160 even though the default attentiveness analysis of the faces and eyes does not amount to the high attentiveness, as in the cases of cooking, exercise, or other instructional/educational contents where the user 101 is performing certain activities presented in the streaming content 109 with hands and looking at objects of the activities. Similarly, the cognitive multicasting engine 130 can specify a posture of the user 101 sitting in front of the stationary device 110 would be associated with a higher attentiveness score 160 than another posture of the user 101 walking about in the viewing area and preparing dinner, talking with others, etc., based on analyzing the images of postures. Similarly, the cognitive multicasting engine 130 can specify a sound uttered by the user 101 in relation with the streaming content 109, as yelling in excitement, commenting on the streaming content 109, etc., to be associated with a higher attentiveness score 160 than another sound when the user 101 is talking on a subject unrelated with the streaming content 109, based on analyzing the audio data captured by a microphone of the audience monitoring device 115.

In block 230, the cognitive multicasting engine 130 determines whether or not to multicast the streaming content 109, based on classifying the streaming content 109 and assessing the attentiveness score 160 of the user 101. The cognitive multicasting engine 130 classifies the streaming content 109. If the streaming content 109 is of a class for multicasting, then the cognitive multicasting engine 130 subsequently analyzes any mobile device activity of the user 101 based on the device status data 127 and assesses the attentiveness score 160 based on the viewing behavior data 125 and the mobile device activity of the user 101. The combination of the viewing behavior data 125 and the mobile device activity of the user 101 as represented in the device status data 127 represents a level of comprehensive attentiveness of the user 101 to the streaming content 109, which is quantified as the attentiveness score 160. Based on comparing the assessed attentiveness score 160 with a predefined multicasting threshold (MT), the cognitive multicasting engine 130 determines whether or not to multicast the streaming content 109 to the mobile device 117 for the user 101. Detailed operations of block 230 as performed by the cognitive multicasting engine 130 are presented in FIG. 3 and corresponding description. Then, the cognitive multicasting engine 130 proceeds with block 240.

In block 240, the cognitive multicasting engine 130, upon detecting a triggering event for multicasting, determines whether or not to multicast the streaming content 109 to the mobile device 117, based on the results from the multicasting analysis in block 230. If the cognitive multicasting engine 130 determines to multicast the streaming content 109 to the mobile device 117 as determined from block 350, then, the cognitive multicasting engine 130 proceeds with block 250. The cognitive multicasting engine 130 loops back to block 220 in order to continue monitoring on the behavior of the user 101, if the cognitive multicasting engine 130 determines not to multicast the streaming content 109 to the mobile device 117 as determined from block 360 upon detecting the triggering event, or if the cognitive multicasting engine 130 does not detect any triggering event within a preconfigured expiration time period for the multicasting decision made in block 230. The cognitive multicasting engine 130 records the triggering event and all environment data in the multicasting knowledgebase 150 in order to refine the quality of knowledge in the multicasting knowledgebase 150.

In this specification, the triggering event for multicasting to the mobile device 117 indicates any change in the viewing behavior data 125 of the user 101 as being monitored by the audience monitoring device 115, and/or in the device status data 127 representing mobile device activities of the user 101, which had been specified to activate multicasting the streaming content 109 to the mobile device 117. Examples of the triggering event include, but are not limited to, walking out of the viewing area of the stationary device 110 by the user 101 while carrying the mobile device 117, and beginning to use the mobile device 117 by the user 101 while remaining in the viewing area as detected by the device status data 127, which is also detected from the viewing behavior data 125 as the user 101 looks down instead of looking directly to the screen of the stationary device 110.

The cognitive multicasting engine 130 can further specify aspects of the triggering event such as the duration of the triggering event, any particular mobile app with which the user 101 interacts, any specific area outside of the viewing area into which the user 101 moves. As noted, certain areas to which the user 101 moves or certain mobile apps with which the user 101 interacts can be designated as either for multicasting or for no multicasting, and associated with an instance of the attentiveness score 160 that is greater than the multicasting threshold for multicasting, or another instance of the attentiveness score 160 that is less than the multicasting threshold for no multicasting.

Further in specifying the triggering events, the cognitive multicasting engine 130 specifies a certain list of words that may appear in the mobile device activity that will take precedence over multicasting of the streaming content 109. In the same embodiment, the cognitive multicasting engine 130 can analyze the device status data 127 and filter a certain task with which the user 101 is involved a current the mobile device activity. For example, if the user 101 interacts with a text messaging app on the mobile device 117, the device status data 127 can screen received text and evaluate if and how much priority should be given to the mobile device activity, by use of the predefined list of priority words. If the received text talks about someone being in an emergency room or inclement weather in local area and road closures, for example, then the cognitive multicasting engine 130 would automatically turn off multicasting the streaming content 109 such that the user 101 can attend to the task requested in the mobile device activity and/or focus on information from the mobile device activity.

In certain embodiments of the present invention, the cognitive multicasting engine 130 can check the override conditions for certain types of streaming content 109 before analyzing the viewing behavior data 125 and the device status data 127 for mobile device activities. Accordingly, the cognitive multicasting engine 130 can process the multicasting decisions more efficiently without performing the multicasting analysis in block 230, because the cognitive multicasting engine 130 can make the decision on whether or not multicast the streaming content 109 solely based on the override conditions and the attentiveness scores 160 respectively corresponding to the override conditions.

In block 250, the cognitive multicasting engine 130 generates the mobile streaming content 129 based on the streaming content 109 according to the display configuration 140 and subsequently begins multicasting the generated mobile streaming content 129 to the mobile device 117. Then, the cognitive multicasting engine 130 loops back to block 220 to continue monitoring the viewing behavior and mobile activities of the user 101.

In certain embodiments of the present invention, the cognitive multicasting engine 130 has a predefined set of instructions on how to display the streaming content 109 on the mobile device 117 stored as the display configuration 140. In this specification, each instruction for display on the mobile devices 117 is also referred to as a display instruction 140. In the same embodiment, the cognitive multicasting engine 130 renders the mobile streaming content 129 as a combination of the streaming content 109 and an instruction from the display configuration 140. The cognitive multicasting engine 130 sends a respective mobile streaming content 129 with distinctive display configuration 140 to each mobile device 117, where the user 101 engages more than one mobile device 117 at the same time.

A specific display configuration 140 is selected according to various factors of, including, but not limited to, the content class of the streaming content 109, the attentiveness score 160 of the user 101 while watching the streaming content 109 on the stationary device 110, the display specifications of respective mobile devices 117 according to the device status data 127, a current mobile device activity such as identities of active apps and the level of interaction with the user 101 according to the device status data 127, user preferences for playing mobile streaming content on the respective mobile devices 117 as stored in the user profile of the user 101, a distance of the user 101 to the viewing area of the stationary device 110, respective to an audible range and a visible range, also based on the current location info from the device status data 127, available network bandwidth for delivery to the mobile device 117, and combinations thereof.

In certain embodiments of the present invention, one exemplary instruction of the display configuration 140 indicates that the mobile streaming content 129 is a full screen display of the streaming content 109 on the mobile device 117 with no interference, if the user 101 moves out of the viewing area of the stationary device 110 without using any app on the mobile device 117 while attentively watching the streaming content 109 that is classified as multicast-enabled.

In the same embodiment, another instruction in the display configuration 140 indicates that the mobile streaming content 129 is to be a half-screen display on the mobile device 117 if the user 101 swipes the screen, or uses an app on the mobile device 117 under the same circumstances as the full screen display instruction as above. In the same embodiment, still another instruction in the display configuration 140 indicates that the screen space on the mobile device 117 allocated for the mobile streaming content 129 varies according to with which app the user 101 is interacting at the moment of multicasting. In the same embodiment, still another instruction in the display configuration 140 indicates that the mobile streaming content 129 is to be a full screen display on the mobile device 117 with overlaid display or a ticker of texts from a text message app, if the user 101 is using the text message app that had been set for text overlaying/ticker in the display configuration 140.

In certain embodiments of the present invention, the cognitive multicasting engine 130 utilizes the attentiveness score 160 in determining how a specific instance of the display configuration 140. The cognitive multicasting engine 130 sets the display configuration 140 per screen proportions, and maps a higher attentiveness score 160 to a larger screen proportion on the mobile device 117. As noted, the attentiveness score 160 indicates how focused the user 101 is on the streaming content 109 while the streaming content 109 is displayed on the stationary device 110, as represented in the viewing behavior data 125.

In the same embodiment of the present invention as above where the viewing area is specified in terms of the visible range and the audible range, the display configuration 140 is to respectively specify whether or not to multicast video portion and audio portion of the streaming content 109, according to visibility and audibility on the audio and video of the streaming content 109 from the stationary device 110 by the user 101. For example, if the user 101 is out of the visible range but within the audible range from the stationary device 110, then the display configuration 140 specifies that the mobile streaming content 129 includes only the video portion of the streaming content 109. The content streaming device It should be noted that the streaming content 109 is played on the stationary device 110 simultaneously with the mobile streaming content 129 on the mobile device 117. Accordingly, if the user 101 is within the audible range of the stationary device 110 but simply looks down and reads an email on the mobile device 117 while sitting in front of the stationary device 110, the cognitive multicasting engine 130 needs not select the display configuration 140 with an audio as the user 101 can still hear from the stationary device 110.

When combined with selecting the display configuration 140 corresponding to the attentiveness score 160, the cognitive multicasting engine 130 sets the display configuration 140 that includes instructions of: a half screen display without audio; a half screen display with audio; a full screen display without audio; and a full screen display with audio. In the same example, the cognitive multicasting engine 130 maps attentiveness scores 160 of five (5) or lower to one of the half-screen displays and attentiveness scores of six or higher to one of the full screen displays, depending on the location of the user 101 in terms of the visible range and the audible ranger from the stationary device 110, where the attentiveness score 160 is assessed in the aforementioned scale of [0 . . . 9].

In the same embodiment of the present invention, for a specific mobile device 117 with a larger screen such as a tablet or a laptop, the cognitive multicasting engine 130 can set the display configuration 140 for a quarter screen, a one-third screen, a half screen, a three-quarters screen, or a full screen, or any other percentage of the mobile screen for the multicasting as selected by the user 101, based on respective values of the attentiveness score 160. Also, the cognitive multicasting engine 130 can set the display configuration 140 with various layouts on the screen of the mobile device 117, including but not limited to, a split screen with varied positions for the display of the mobile streaming content 129 on one area and for the mobile device app display on other area, a picture-in-picture with varied positions for the display of the mobile streaming content 129 within the mobile device app display, and a text overlay for the mobile device app display on top of variously sized display for the mobile streaming content 129.

In certain embodiments of the present invention, the cognitive multicasting engine 130 begins receiving the streaming content 109 as a whole from the content streaming device 113 in block 250 for the first time to render the mobile streaming content 129 for multicasting. Prior to block 250, in the same embodiment, the cognitive multicasting engine 130 uses only metadata of the streaming content 109 and/or sampled images from the streaming content 109 in classifying the streaming content 109 in block 230, in order to improve processing performance. Particularly, the cognitive multicasting engine 130 can minimize network traffic of the cognitive content multicasting system 120 and other devices by delaying the transfer of the streaming content 109 only when the streaming content 109 is determined to be multicasted.

Figure 3:
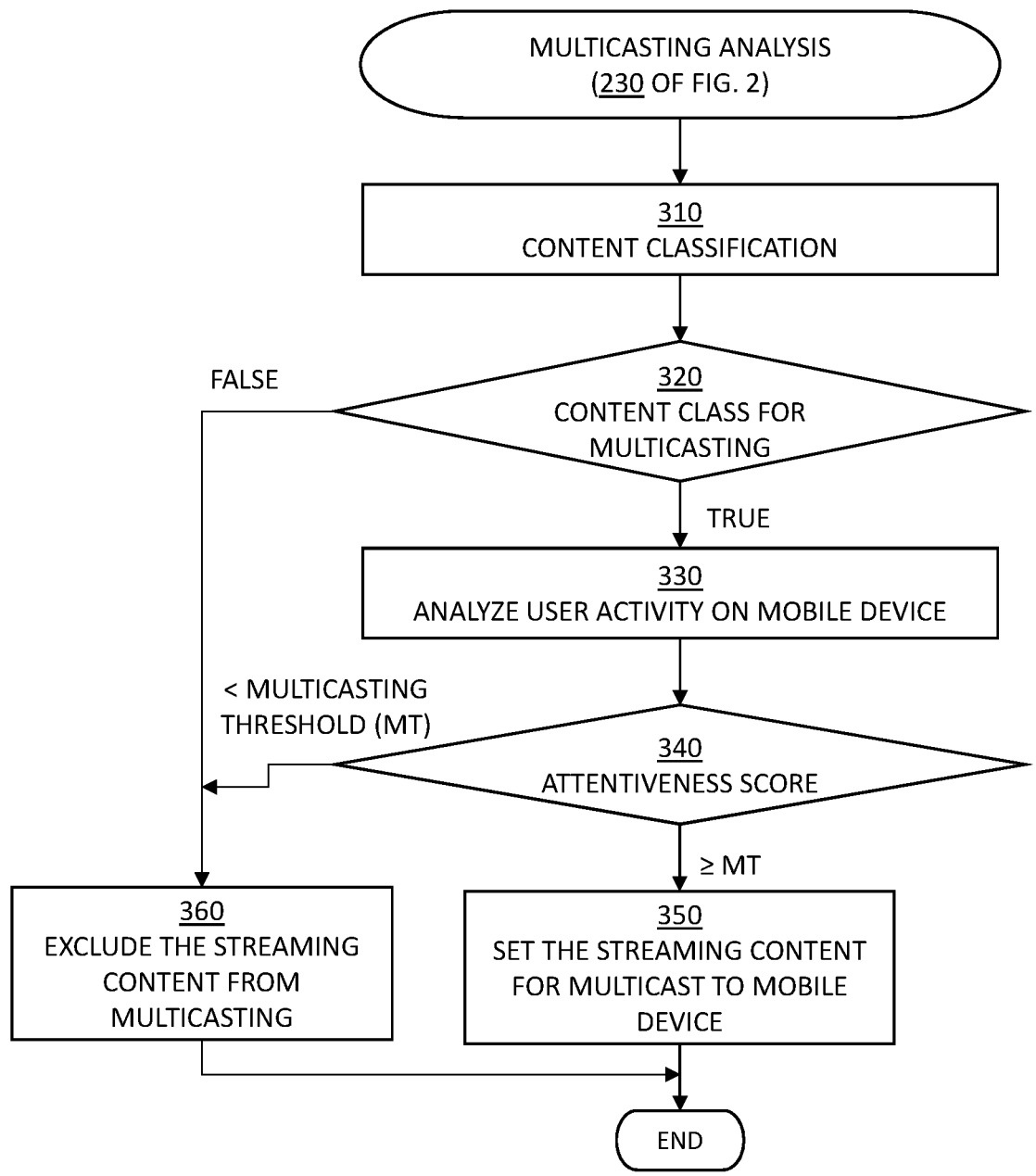
FIG. 3 depicts a flowchart of the cognitive multicasting engine as performed in block 230 of FIG. 2, in accordance with one or more embodiments set forth herein.

FIG. 3 depicts a flowchart of the multicasting analysis in block 230 of FIG. 2 as performed by the cognitive multicasting engine 130, in accordance with one or more embodiments set forth herein.

In block 310, the cognitive multicasting engine 130 classifies the streaming content 109 for the purpose of multicasting, based on a series of still images periodically sampled from the streaming content 109. The cognitive multicasting engine 130 utilizes content classes with respect to genre, user attentiveness, and multicasting preferences, as stored in the multicasting knowledgebase 150. The cognitive multicasting engine 130 can utilize an external machine learning tool to build the multicasting knowledgebase 150 from past runs of the cognitive content multicasting system 120 and user feedbacks thereto. Then, the cognitive multicasting engine 130 proceeds with block 320.

In certain embodiments of the present invention, the cognitive multicasting engine 130, from monitoring the viewing behavior of the user 101 in block 220, has periodically sampled images from the streaming content 109 to timestamp the viewing behavior data 125 on the user 101, which are also periodically sampled for efficiency. The cognitive multicasting engine 130 can be configured to sample images from the streaming content 109 only when the user 101 shows any significant change in the viewing behavior, instead of obtaining the streaming content 109 as a whole from the content streaming device 113. Accordingly, the cognitive multicasting engine 130 already has some portion of the streaming content 109 as sampled during block 220 at the beginning of block 230, of which operations begin with block 310. In any case, the cognitive multicasting engine 130 samples the streaming content 109 for a preconfigured period of time while the streaming content 109 is being played on the stationary device 110, concurrently with monitoring the viewing behavior of the user 101.

In the same embodiment, the cognitive multicasting engine 130 uses the images sampled from the streaming content 109 in block 220 and/or metadata of the streaming content 109 in classifying the streaming content 109. Embodiments of the present invention recognizes that metadata of the streaming content 109 include information about the streaming contents 109 such as transcripts of conversations, text descriptions of scenes, or any other textual information on the streaming content 109 to facilitate searches on video clips, which include the streaming content 109.

Utilizing the sampled still images and the metadata for content classification significantly reduces the data traffic between the content streaming device 113 and the cognitive content multicasting system 120, while effectively classifying the streaming content 109. For example, if the streaming content 109 is a movie having a standard rate of twenty-four (24) frames per second, the cognitive multicasting engine 130 would reduce the amount of data traffic down to approximately four (4) percent of the size of the streaming content 109 by sampling the streaming content 109 every second.

The cognitive multicasting engine 130 can develop, based on repeated runs and user feedbacks, a pattern in the series of sampled still images from the streaming content 109 to classify the streaming content 109 into various genres or any other classes for the purpose of multicasting. In content classification, the cognitive multicasting engine 130 further utilizes external image recognition tools for the content classification, of which functionalities are not within the scope of the present specification. Examples of the genres include, but are not limited to, sports, news, drama, movie, documentary, music, reality, commercial, etc. Also the cognitive multicasting engine 130 cumulates attentiveness scores corresponding to various genres of the streaming content 109, and develops a general pattern in relationships between the respective genres and the level of attentiveness corresponding to the respective genres.

In certain embodiments of the present invention, the content classes stored in the multicasting knowledgebase 150 include, but are not limited to, content classes represented as respective pairs of a genre of the content and an average attentiveness score corresponding to the genre, as observed from past runs of the cognitive content multicasting system 120. One instance in the content classes is represented as {sports, 8}, in the attentiveness score of the range [0 . . . 9], indicating that for the streaming content 109 of a sports game, users are generally very attentive to the streaming content 109. Another instance in the genre classes is represented as {commercial, 1}, in the same attentiveness score range as above, indicating that when the streaming content 109 plays a commercial, users rarely pay much attention to the streaming content 109. Accordingly, the cognitive multicasting engine 130 classifies the sports games in the streaming content 109 as a class for multicasting, and the commercials in the streaming content 109 as a class not for multicasting. The same instances of the content classes above, accordingly, can be represented as {sports, True} and {commercial, False}, respectively, where the Boolean value in each instance indicates if the genre of the content preceding the Boolean value is for multicasting, as being compared with a multicasting threshold, for example, of five (5).

In certain embodiments of the present invention, the cognitive multicasting engine 130 is configured to apply user-specific content classification, as stored in the user profile for the user 101. The cognitive multicasting engine 130 can be configured to override the multicasting threshold of the attentiveness score for a certain content classes specified for unconditional multicasting. For example, if the user 101 often enjoys listening to news casts, documentaries, or music videos while moving in and out of the viewing area of the stationary device 110, the cognitive multicasting engine 130 facilitates the user 101 to specify these content classes to be multicasted without considering the attentiveness score as demonstrated by the viewing behavior of the user 101. Accordingly, content classes customized for the user 101 will include {news, True}, {documentary, True}, and {music, True} in the user profile and/or in the multicasting knowledgebase 150.

In block 320, the cognitive multicasting engine 130 determines whether or not the streaming content 109 is classified as a class for multicasting. If the cognitive multicasting engine 130 determines that the streaming content 109 is of a class for multicasting, then the cognitive multicasting engine 130 proceeds with block 330. If the cognitive multicasting engine 130 determines that the streaming content 109 is of a class not for multicasting, then the cognitive multicasting engine 130 proceeds with block 360.

In block 330, the cognitive multicasting engine 130 analyzes the viewing behavior of the user 101 based on the viewing behavior data 125 from the audience monitoring device 115 and the mobile device activities of the user 101 as represented in the device status data 127 from the mobile device 117. The cognitive multicasting engine 130 calculates the attentiveness score 160 of the user 101 to the streaming content 109 based on the viewing behavior analysis. Then, the cognitive multicasting engine 130 proceeds with block 340.

In certain embodiments of the present invention, the cognitive multicasting engine 130 calculates the attentiveness score 160 based on the viewing behavior data 125 as being monitored in block 220, either periodically, upon receiving the viewing behavior data 125, or whenever the content class is changed in block 310. In the same embodiments, the cognitive multicasting engine 130 can have the attentiveness score 160 continuously updated, simultaneously with the updates of the viewing behavior data 125 as obtained from the audience monitoring device 115.

In other embodiments of the present invention, the cognitive multicasting engine 130 has a list of average attentiveness scores 160 corresponding to content classes as determined in block 310 based on previous runs of the cognitive content multicasting system 120 and/or general media study statistics as stored in the multicasting knowledgebase 150. In the same embodiments, the cognitive multicasting engine 130 utilizes the list and applies the average attentiveness score associated with the content class determined from block 310 by default.

In certain embodiments of the present invention, the cognitive multicasting engine 130 have a predefined list of high-priority mobile device activities that override viewing behavior analysis and invoke respective adjustments to the attentiveness score 160 as calculated from the viewing behavior data 125. In the same embodiments, the cognitive multicasting engine 130 first screens the device activity data 127 from the mobile device 117 to see if the mobile device activity is of a high priority. For high-priority mobile device activities, the cognitive multicasting engine 130 can adjust a previously calculated attentiveness score 160 by reducing a certain points, or simply assign a lowest value for the attentiveness score 160 for high priority mobile device activities such that the user 101 can pay full attention to the high priority mobile device activity. Examples of the high priority mobile activities include, but are not limited to, voice calls from favorite contacts, intensive interaction on the mobile device 117 as in gaming or heavy typing on the text message app, watching another content distinctive from the streaming content on the mobile device, emergency notification from authorities such as the weather service, a fire/police department, or any other mobile device activities customized as a high priority activity in the user profile. In the same embodiments, the high priority mobile device activities will take precedents of the content classes assigned for unconditional multicasting in block 310, in the process of adjusting the attentiveness score 160 in block 330, because adjusting the preconfigured content classes for multicasting with the high priority mobile device activities can be done instantaneously without changing the preferences in the user profile.

In block 340, the cognitive multicasting engine 130 determines whether or not the attentiveness score 160 is high enough for multicasting, by comparing with the predefined multicasting threshold (MT). If the cognitive multicasting engine 130 determines that the attentiveness score 160 is greater than or equal to the MT, then the cognitive multicasting engine 130 proceeds with block 350. If the cognitive multicasting engine 130 determines that the attentiveness score 160 is less than the MT, then the cognitive multicasting engine 130 proceeds with block 360.

In block 350, the cognitive multicasting engine 130 sets the streaming content 109 for multicasting to the mobile device 117 as the mobile streaming content 129, as the attentiveness score 160 meets the multicasting threshold as determined in block 340. Then, the cognitive multicasting engine 130 terminates the multicasting analysis of block 230 and proceeds with block 240 of FIG. 2.

In block 360, the cognitive multicasting engine 130 excludes the streaming content 109 from multicasting to the mobile device 117 because the attentiveness score 160 is less than the multicasting threshold as determined in block 340. The cognitive multicasting engine 130 sets the attentiveness score 160 below the multicasting threshold based on various findings including, but not limited to, that the content class is set for no multicasting in the user profile, that the user 101 is inattentive to the streaming content 109 based on the viewing behavior data 125, that the user 101 is engaged in a high priority mobile device activity based on the device status data 127. Then, the cognitive multicasting engine 130 terminates the multicasting analysis of block 230 and proceeds with block 240 of FIG. 2.

Figure 4:
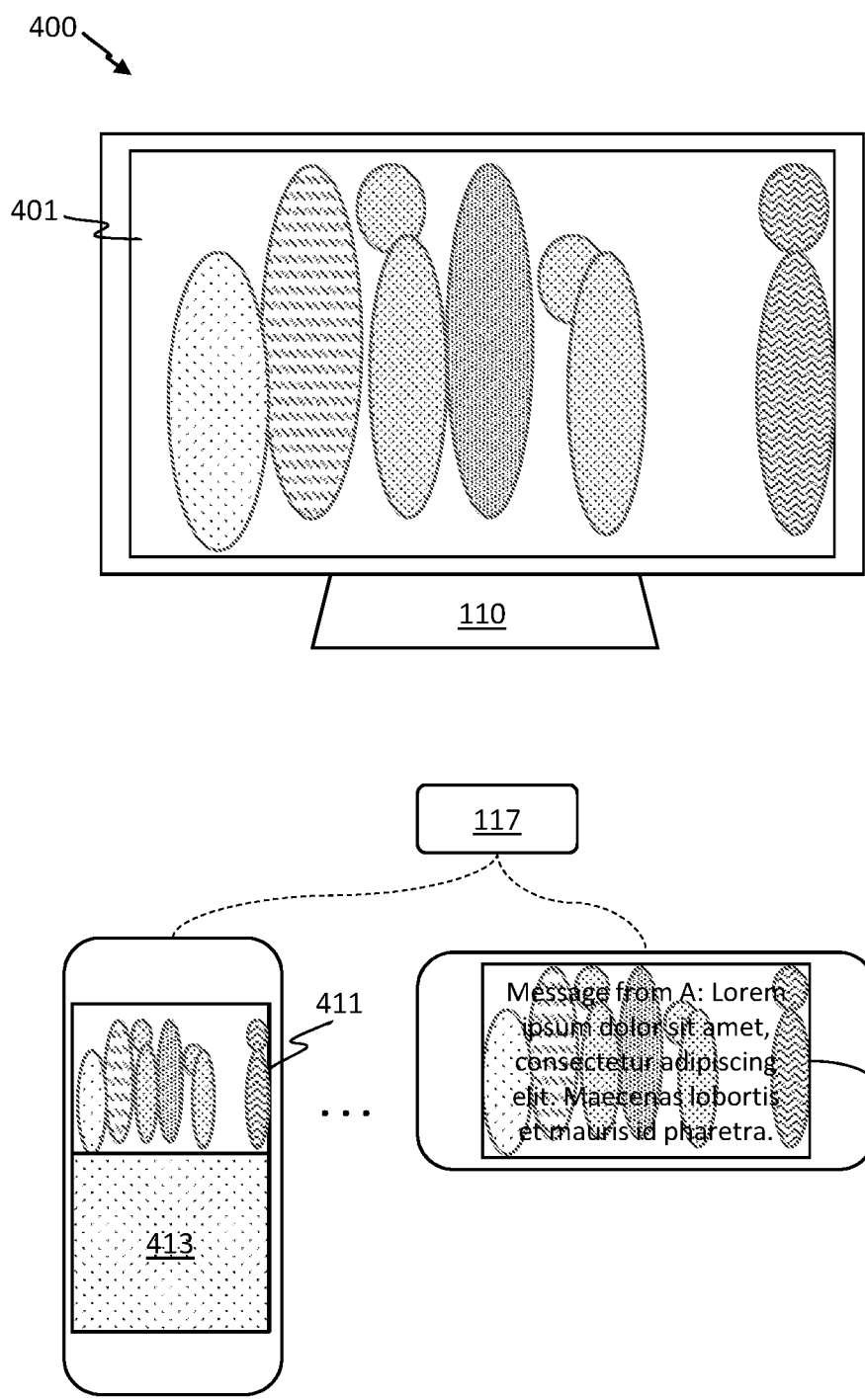
FIG. 4 depicts a couple of exemplary displays of the streaming content on the stationary device and the mobile streaming content on the mobile devices according to respective display configurations as rendered in block 250 of FIG. 2, in accordance with one or more embodiments set forth herein.

FIG. 4 depicts some exemplary displays 400 of the streaming content 109 on the stationary device 110 and the mobile streaming content 129 on the mobile devices 117 according to respective display configurations 140 as rendered in block 250 of FIG. 2, in accordance with one or more embodiments set forth herein.

The exemplary displays 400 include a couple of display configurations 140 on the mobile device 117 for a standard display 401 of the streaming content 109 on the stationary device 110, including, but not limited to, a half-screen display 411 on the mobile device 117 and a full-screen overlaid text display 421 on the mobile device 117. The display configuration 140 further include a simple relay as a full screen on the mobile device 117 for low priority mobile device activities, a picture-in-picture display of the mobile streaming content 129 within a display of a mobile device app, or the similar, of which depictions are not presented in this specification.

As noted, the cognitive multicasting engine 130 determines a specific display configuration 140 indicating how to render the mobile streaming content 129, based on various aspects of the viewing including, but not limited to, the attentiveness of the user 101 on the streaming content 109, the user activity on the mobile device 117, and preference settings on displays as set in the user profile.

In the exemplary displays 400, the half-screen display 411 of the mobile streaming content 129 on the mobile device 117 is based on one of the display configuration 140 for cases where the user 101 has been monitored as attentive enough for multicasting of the streaming content 109 and the user 101 is engaged in a high-priority mobile device activity as a triggering event for multicasting. The display configuration 140 reserves another half of the screen 413 for the high-priority mobile device activity, such that the user 101 can perform the high-priority mobile device activity and simultaneously watch the mobile streaming content 129 as the half-screen display 411 on one screen of the mobile device 117.

In the exemplary displays 400, the full-screen overlaid text display 421 of the mobile streaming content 129 on the mobile device 117 is based on another display configuration 140 for cases where the user 101 has been monitored as attentive enough for multicasting of the streaming content 109 and the user 101 is engaged in a text-based, low-priority mobile device activity as a triggering event for multicasting. Accordingly, the display configuration 140 indicates to render the streaming content 109 as a full screen display on the mobile device 117, with overlaying texts of the mobile device activity on top of the mobile streaming content 129, such that the user 101 can interact with the text-based app and simultaneously watch the mobile streaming content 129 on the same screen of the mobile device 117.

The one or more display configuration 140 specifies how the streaming content 109 is to be displayed on the mobile device 117 as being multicasted by the cognitive content multicasting system 120. The cognitive multicasting engine 130 renders the mobile streaming content 129 based on one of the display configuration 140 corresponding to a combination of the device status data 127 and a certain level of attentiveness of the user 101 on the streaming content 109 while being displayed on the stationary device 110. The display configurations 140 generally implement a more prominent display on the mobile device 117 for a higher attentiveness score 160 as monitored on the user 101.

Certain embodiments of the present invention may offer various technical computing advantages, including the use of cognitive analytics system to assess discernable levels of attentiveness demonstrated by the user on the streaming content, the use of machine learning tools to classify the streaming content in relation with the desirability of the streaming content for multicasting, and subsequent training of the classification functionality. User presence is detected and identified automatically based on facial recognition while watching the streaming content on the stationary device, and mobile devices registered for the user is notified to report status of use activities and locations of the mobile devices to facilitate multicasting upon being triggered. The level of attentiveness by the user is assessed as the attentiveness score and further adjusted based on various user preference settings, mobile activity priorities, for finally determining whether or not to multicast the streaming content onto the mobile devices. In cases for multicasting, various display configurations instructing how to render the mobile streaming content is further selected based on the attentiveness score, the mobile device activities, and the user preferences. Accordingly, certain embodiments of the present invention facilitate the user to continuously watch the streaming content even when certain multitasking is necessary on the mobile device or even when the user should move away from the viewing area of the stationary device during the play of the streaming content. Some functionalities of certain embodiments of the present invention may be implemented by use of a cloud platform/data center in various types including a Software-as-a-Service (SaaS), Platform-as-a-Service (PaaS), Database-as-a-Service (DBaaS), and combinations thereof based on types of subscription. The cognitive content multicasting service may be implemented as various types of audio visual equipment, as being integrated and/or separately from the audience monitoring device, the stationary device, the content streaming device, and combinations thereof.

Figure 5:
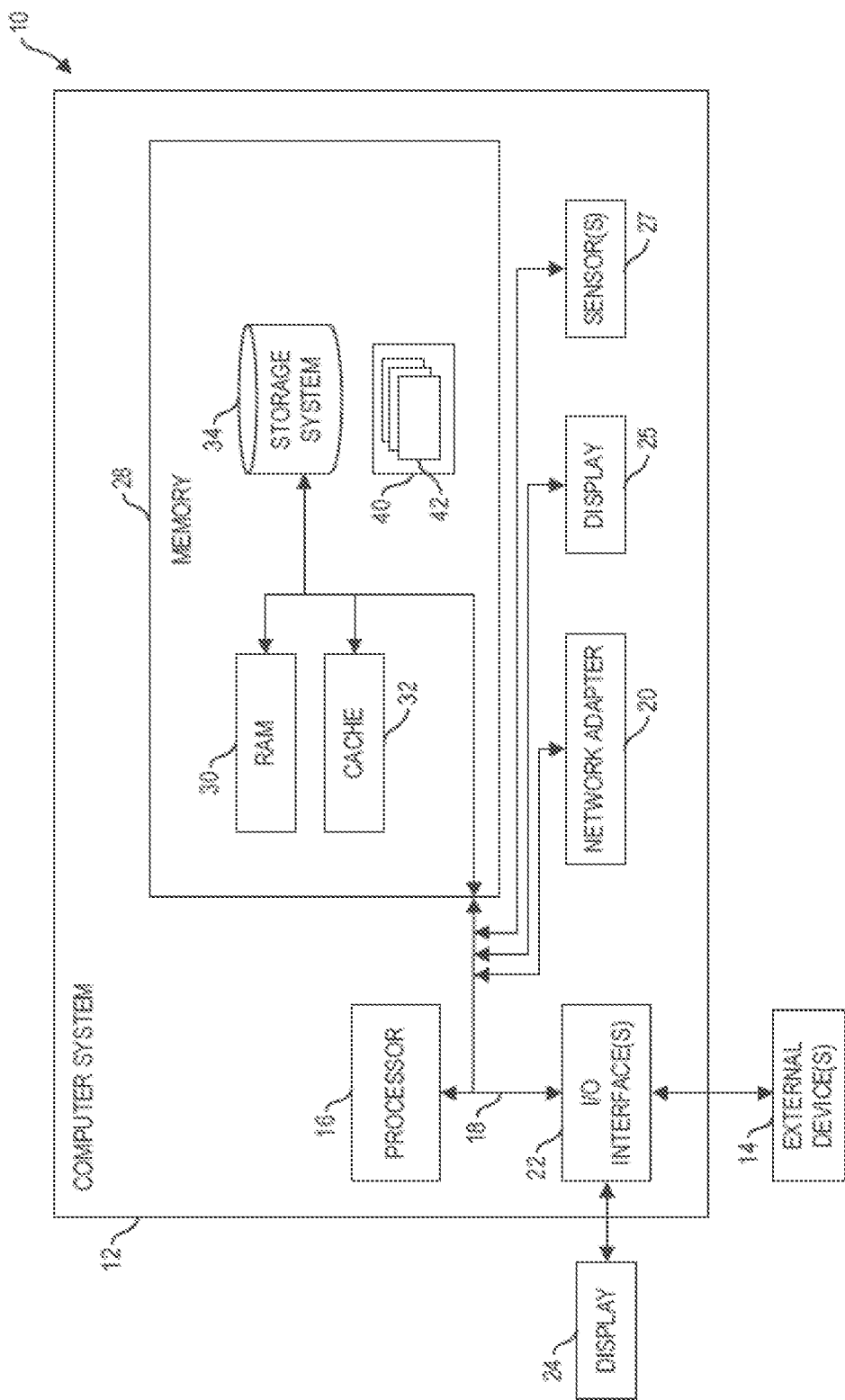
FIG. 5 depicts a cloud computing node according to an embodiment of the present invention.
Figure 6:
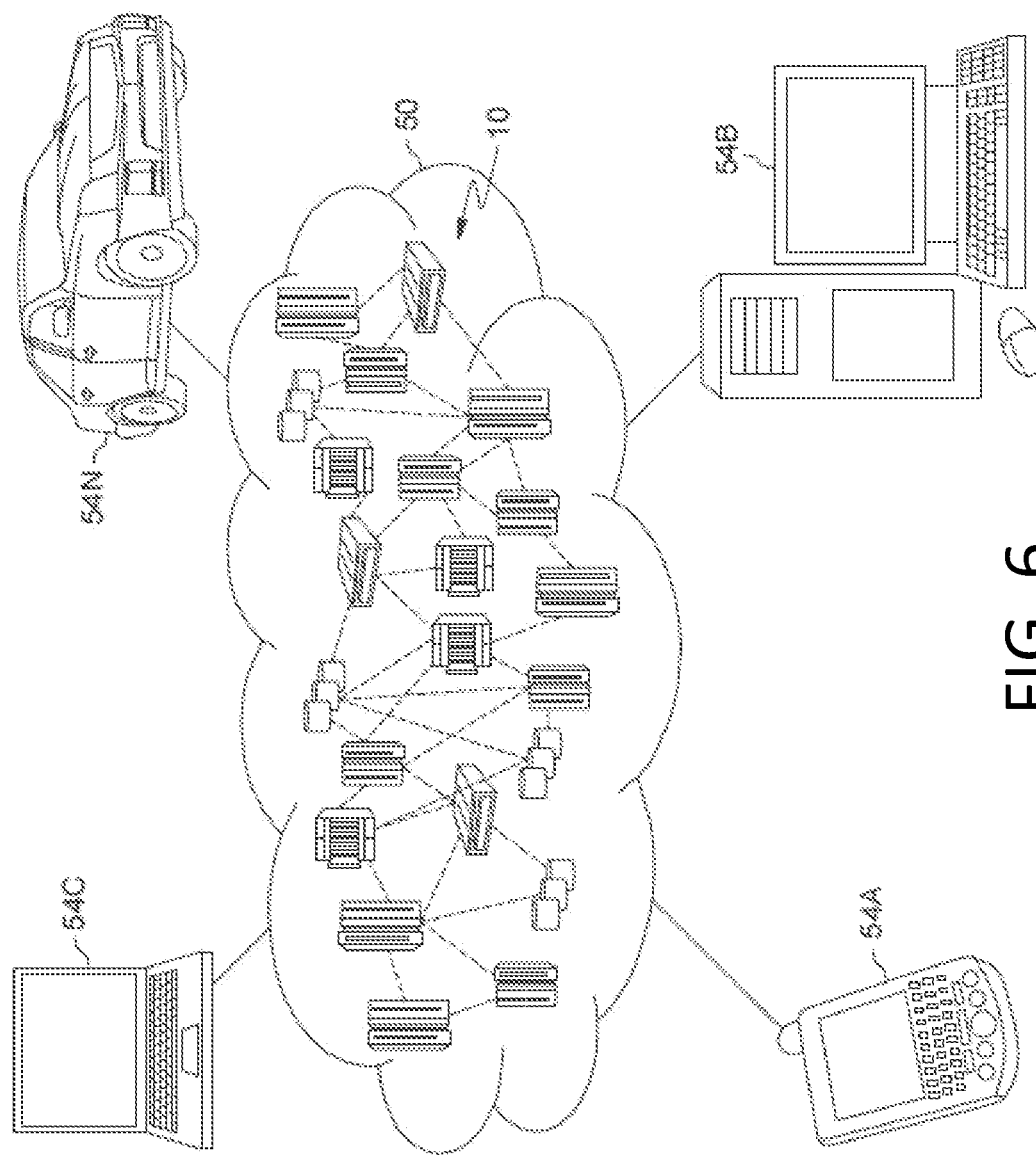
FIG. 6 depicts a cloud computing environment according to an embodiment of the present invention.
Figure 7:
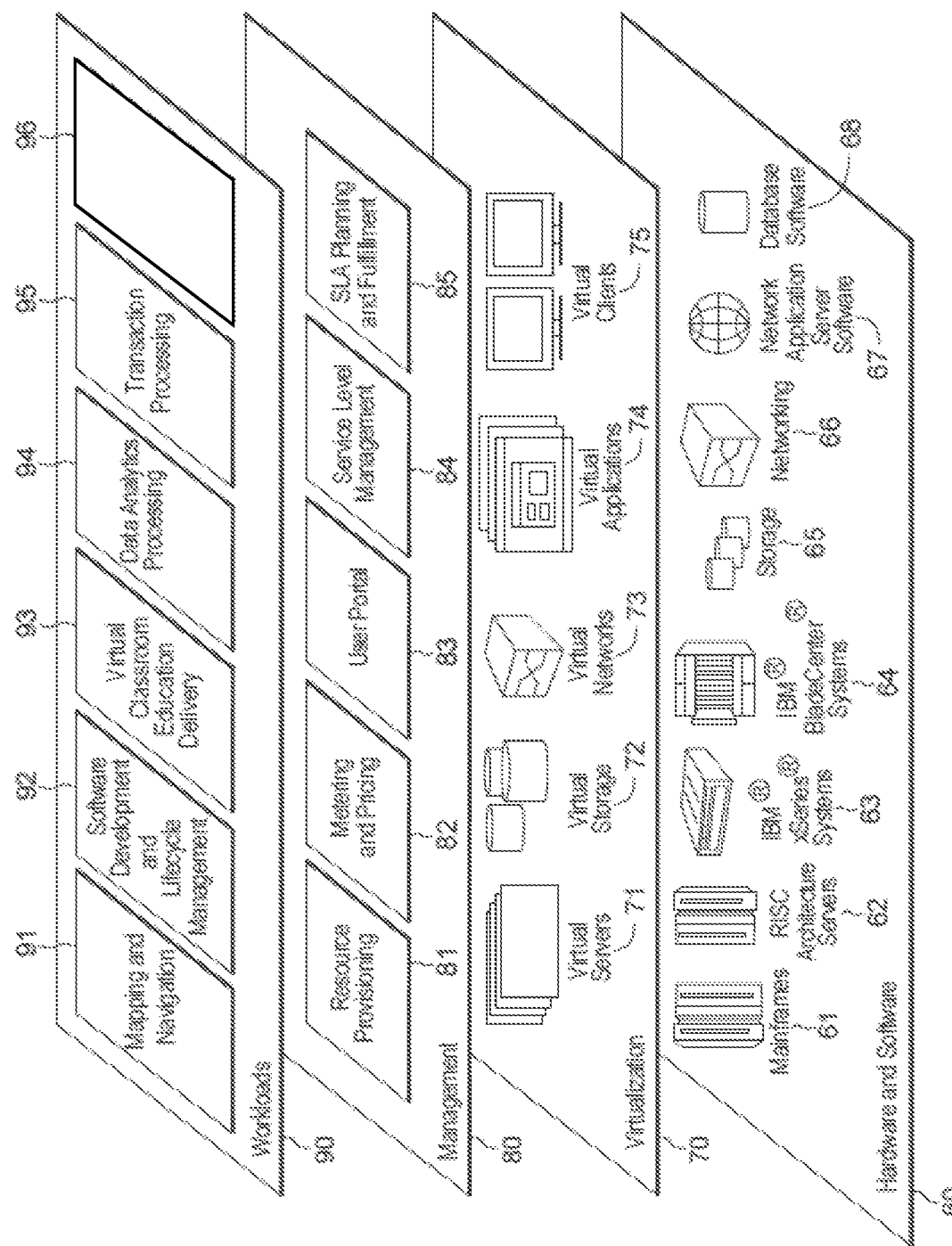
FIG. 7 depicts abstraction model layers according to an embodiment of the present invention.

FIGS. 5-7 depict various aspects of computing, including a cloud computing system, in accordance with one or more aspects set forth herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 5, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 5, computer system 12 in cloud computing node 10 is shown in the form of a general-purpose computing device. The components of computer system 12 may include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile memory device (e.g., a "thumb drive", "external hard drive"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. Each of the operating system, one or more application programs, other program processes, and program data or some combination thereof, may include an implementation of the cognitive multicasting engine 130 and the cognitive content multicasting system 120 of FIG. 1, respectively. Program processes 42, as in the cognitive multicasting engine 130 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18.

In addition to or in place of having external devices 14 and the display 24, which can be configured to provide user interface functionality, computing node 10 in one embodiment can include another display 25 connected to bus 18. In one embodiment, the display 25 can be configured as a touch screen render and can be configured to provide user interface functionality, e.g. can facilitate virtual keyboard functionality and input of total data. Computer system 12 in one embodiment can also include one or more sensor device 27 connected to bus 18. One or more sensor device 27 can alternatively or in addition be connected through I/O interface(s) 22. The one or more sensor device 27 can include a Global Positioning Sensor (GPS) device in one embodiment and can be configured to provide a location of computing node 10. In one embodiment, the one or more sensor device 27 can alternatively or in addition include, e.g., one or more of a camera, a gyroscope, a temperature sensor, a humidity sensor, a pulse sensor, a blood pressure (BP) sensor or an audio input device.

It should be understood that although not shown, other hardware and/or software components could be used in conjunction with computer system 12. Examples, include, but are not limited to: microcode, device drivers, redundant processors, external disk drive arrays, RAID systems, tape drives, and data archival storage systems, etc.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and some processing components for the cognitive content multicasting services as provided by the cognitive content multicasting system 96, as described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method, comprising:

identifying, by one or more processor, a user and one or more mobile device registered for the user in a user profile, wherein the user is in a viewing area of a stationary device playing a streaming content;

monitoring, by the one or more processor, viewing behavior of the user on the streaming content within the viewing area, the viewing behavior of the user including a direction to which the user faces, eye movements by the user while watching the streaming content in the viewing area, hand or mouth movements by the user, and ambulatory movements by the user in and out of the viewing area;

determining, by the one or more processor, to multicast the streaming content to a mobile device of the one or more mobile device, based on a combination of: a class of the streaming content, an attentiveness score of the user, and a multicasting threshold condition on the attentiveness score, wherein the attentiveness score of the user quantifies how attentive the user is in viewing the streaming content as being measured by the viewing behavior from the monitoring;

rendering, by the one or more processor, a mobile streaming content by combining a display configuration and the streaming content, upon detecting a triggering event for multicasting on the user and the mobile device, the triggering event being based on preconfigured changes in the viewing behavior by the user, wherein the display configuration indicates how to display the streaming content on the mobile device, wherein the display configuration specifies a display on the screen of the mobile device, and wherein the display configuration specifies aspects of the display including a percentage of the display to the screen of the mobile device that is greater for a higher attentiveness score of the user; and multicasting, by the one or more processor, the mobile streaming content to the mobile device for the user, simultaneously with sending the streaming content to the stationary device.

2. The computer implemented method of claim 1, wherein the triggering event is a change in the viewing behavior by the user as being caused by a mobile device activity the user is engaged on the mobile device or any ambulatory movement of the user while carrying the mobile device away from the viewing area of the stationary device.

3. The computer implemented method of claim 1, the determining comprising:

classifying the streaming content into a class for multicasting;

analyzing device status data from the mobile device for a mobile device activity by the user;

assessing the attentiveness score based on a combination of the viewing behavior of the user and the mobile device activity by the user;

ascertaining that the attentiveness score satisfies the multicasting threshold condition for multicasting; and setting the streaming content for multicasting upon detecting the triggering event.

4. A computer program product comprising: a computer readable storage medium readable by one or more processor and storing instructions for execution by the one or more processor for performing a method comprising:

identifying a user and one or more mobile device registered for the user in a user profile, wherein the user is in a viewing area of a stationary device playing a streaming content;

monitoring viewing behavior of the user on the streaming content within the viewing area, the viewing behavior of the user including a direction to which the user faces, eye movements by the user while watching the streaming content in the viewing area, hand or mouth movements by the user, and ambulatory movements by the user in and out of the viewing area;

determining to multicast the streaming content to a mobile device of the one or more mobile device, based on a combination of: a class of the streaming content, an attentiveness score of the user, and a multicasting threshold condition on the attentiveness score, wherein the attentiveness score of the user quantifies how attentive the user is in viewing the streaming content as being measured by the viewing behavior from the monitoring;

rendering a mobile streaming content by combining a display configuration and the streaming content, upon detecting a triggering event for multicasting on the user and the mobile device, the triggering event being based on preconfigured changes in the viewing behavior by the user, wherein the display configuration indicates how to display the streaming content on the mobile device, wherein the display configuration specifies a display on a screen of the mobile device, and wherein the display configuration specifies aspects of the display including a percentage of the display to the screen of the mobile device that is greater for a higher attentiveness score of the user; and multicasting the mobile streaming content to the mobile device for the user, simultaneously with sending the streaming content to the stationary device.

5. The computer program product of claim 4, wherein the triggering event is a change in the viewing behavior by the user on account of the mobile device or a movement of the user with the mobile device away from the viewing area of the stationary device.

6. The computer program product of claim 4, the determining comprising:

classifying the streaming content into a class for multicasting;

analyzing device status data from the mobile device for a mobile device activity by the user;

assessing the attentiveness score based on a combination of the viewing behavior of the user and the mobile device activity by the user;

ascertaining that the attentiveness score satisfies the multicasting threshold condition for multicasting; and setting the streaming content for multicasting upon detecting the triggering event.

7. The computer program product of claim 6, the assessing comprising:

quantifying the attentiveness score according to the viewing behavior of the user; and increasing the attentiveness score to be greater than the multicasting threshold condition for the class of the streaming content that is specified as preferred in the user profile of the user, or for a certain triggering event of a change in a location of the user without using the mobile device.

8. The computer program product of claim 6, the assessing comprising:

quantifying the attentiveness score according to the viewing behavior of the user; and decreasing the attentiveness score to be less than the multicasting threshold condition for the mobile device activity that is specified as high-priority in the user profile of the user, such that the user will focus on the high-priority mobile device activity without having the streaming content displayed on the mobile device, regardless of the attentiveness score from the viewing behavior.

9. The computer program product of claim 6, wherein the class of the streaming content is selected from the group consisting of the class for multicasting and a class not for multicasting, as stored in a multicasting knowledgebase, and wherein the class for multicasting and the class not for multicasting respectively store genre subclasses in the multicasting knowledgebase.

10. The computer program product of claim 4, wherein the display configuration indicates how to display the streaming content on the mobile device, wherein the display configuration specifies a display on the screen of the mobile device, and wherein the display configuration specifies aspects of the display including a percentage of the display to the screen of the mobile device that is greater for a higher attentiveness score of the user.

11. A system comprising:

a memory; one or more processor in communication with memory; and program instructions executable by the one or more processor via the memory to perform a method comprising:

identifying a user and one or more mobile device registered for the user in a user profile, wherein the user is in a viewing area of a stationary device playing a streaming content;

monitoring viewing behavior of the user on the streaming content within the viewing area, the viewing behavior of the user including a direction to which the user faces, eye movements by the user while watching the streaming content in the viewing area, hand or mouth movements by the user, and ambulatory movements by the user in and out of the viewing area;

determining to multicast the streaming content to a mobile device of the one or more mobile device, based on a combination of: a class of the streaming content, an attentiveness score of the user, and a multicasting threshold condition on the attentiveness score, wherein the attentiveness score of the user quantifies how attentive the user is in viewing the streaming content as being measured by the viewing behavior from the monitoring;

rendering a mobile streaming content by combining a display configuration and the streaming content, upon detecting a triggering event for multicasting on the user and the mobile device, the triggering event being based on preconfigured changes in the viewing behavior by the user, wherein the display configuration indicates how to display the streaming content on the mobile device, wherein the display configuration specifies a display on a screen of the mobile device, and wherein the display configuration specifies aspects of the display including a percentage of the display to the screen of the mobile device that is greater for a higher attentiveness score of the user; and multicasting the mobile streaming content to the mobile device for the user, simultaneously with sending the streaming content to the stationary device.

12. The computer program product of claim 4,
wherein the display configuration is determined based on a combination of the attentiveness score according to the viewing behavior of the streaming content by user, a mobile device activity by the user while watching the streaming content, and a priority corresponding to the mobile device activity set in the user profile by the user, and wherein the display configuration specifies on how to display information from an app corresponding to the mobile device activity, including a screen split between the app and the mobile streaming content, a text overlay on the mobile streaming content, and a ticker on a side of the mobile streaming content, as configured for the app in the mobile device.

13. The computer program product of claim 4,
wherein the display configuration is determined based on a combination of the attentiveness score according to the viewing behavior of the streaming content by user, a mobile device activity by the user while watching the streaming content, and a priority corresponding to the mobile device activity set in the user profile by the user, and wherein the display configuration specifies that the mobile streaming content is a full screen display of with both audio and video of the mobile streaming content, based on ascertaining that the user moves out of the viewing area of the stationary device without using any app on the mobile device and that the attentiveness score meets the multicasting threshold condition while watching the streaming content that is of the class for multicasting.

14. The computer program product of claim 4,
wherein the display configuration is determined based on a combination of the attentiveness score according to the viewing behavior of the streaming content by user, a mobile device activity by the user while watching the streaming content, and a priority corresponding to the mobile device activity set in the user profile by the user, and wherein the display configuration specifies that the mobile streaming content includes only a video portion of the streaming content based on ascertaining that the user is out of a visible range from the stationary device but within an audible range from the stationary device.

15. The computer program product of claim 4,
wherein the class of the streaming content is selected from a plurality of classes specified in a multicasting knowledgebase, and wherein the multicasting threshold condition on the attentiveness score is predetermined based on knowledge accumulated in the multicasting knowledgebase and multicasting preferences set for the one or more mobile devices registered for the user in the user profile.

16. The computer program product of claim 4,
the determining comprising:
classifying the streaming content into a class from a plurality of classes for multicasting specified in a multicasting knowledgebase;

analyzing device status data from the mobile device for a mobile device activity by the user concurrent with the viewing behavior;

assessing the attentiveness score of the user on the streaming content based on a combination of the viewing behavior of the user on the streaming content and the mobile device activity by the user;

ascertaining that the attentiveness score satisfies the multicasting threshold condition for multicasting of the streaming content, wherein the multicasting threshold condition is predefined in the multicasting knowledgebase; and setting the streaming content for multicasting upon detecting the triggering event.

17. The computer program product of claim 4,
the determining comprising:
classifying the streaming content into a class from a plurality of classes for multicasting specified in a multicasting knowledgebase;

tracking locations of the user with respect to the viewing area of the stationary device concurrent with the viewing behavior, wherein the triggering event is a change in the viewing behavior by the user on account of a movement by the user exiting the viewing area of the stationary device;

assessing the attentiveness score of the user on the streaming content based on a combination of the viewing behavior of the user on the streaming content and the locations of the user;

ascertaining that the attentiveness score satisfies the multicasting threshold condition for multicasting of the streaming content, wherein the multicasting threshold condition is predefined in the multicasting knowledgebase; and setting the streaming content for multicasting upon detecting the triggering event.

18. The computer program product of claim 4,
the determining comprising:
classifying the streaming content into a class for multicasting;

analyzing device status data from the mobile device for a mobile device activity by the user;

assessing the attentiveness score based on a combination of the viewing behavior of the user and the mobile device activity by the user;

ascertaining that the attentiveness score satisfies the multicasting threshold condition for multicasting; and setting the streaming content for multicasting upon detecting the triggering event, wherein the viewing behavior of the user including a direction to which the user faces in the viewing area while the streaming content is being played, eye movements by the user while watching the streaming content in the viewing area, hand or mouth movements by the user in the viewing area, and ambulatory movements by the user in and out of the viewing area, wherein the triggering event is a change in the viewing behavior by the user as being caused by a mobile device activity the user is engaged on the mobile device or any ambulatory movement of the user while carrying the mobile device away from the viewing area of the stationary device, and wherein the class of the streaming content is selected from the group consisting of the class for multicasting and a class not for multicasting, as stored in a multicasting knowledgebase, and wherein the class for multicasting and the class not for multicasting respectively store genre subclasses in the multicasting knowledgebase.

19. The computer program product of claim 4, the determining comprising:

classifying the streaming content into a class for multicasting;

analyzing device status data from the mobile device for a mobile device activity by the user;

assessing the attentiveness score based on a combination of the viewing behavior of the user and the mobile device activity by the user;

ascertaining that the attentiveness score satisfies the multicasting threshold condition for multicasting, the assessing comprising:

quantifying the attentiveness score according to the viewing behavior of the user; and decreasing the attentiveness score to be less than the multicasting threshold condition for the mobile device activity that is specified as high-priority in the user profile of the user, such that the user will focus on the high-priority mobile device activity without having the streaming content displayed on the mobile device, regardless of the attentiveness score from the viewing behavior; and setting the streaming content for multicasting upon detecting the triggering event, wherein the viewing behavior of the user including a direction to which the user faces in the viewing area while the streaming content is being played, eye movements by the user while watching the streaming content in the viewing area, hand or mouth movements by the user in the viewing area, and ambulatory movements by the user in and out of the viewing area, wherein the triggering event is a change in the viewing behavior by the user as being caused by a mobile device activity the user is engaged on the mobile device or any ambulatory movement of the user while carrying the mobile device away from the viewing area of the stationary device.

20. The computer program product of claim 4, the determining comprising:

classifying the streaming content into a class for multicasting;

analyzing device status data from the mobile device for a mobile device activity by the user;

assessing the attentiveness score based on a combination of the viewing behavior of the user and the mobile device activity by the user;

ascertaining that the attentiveness score satisfies the multicasting threshold condition for multicasting, the assessing comprising:

quantifying the attentiveness score according to the viewing behavior of the user; and increasing the attentiveness score to be greater than the multicasting threshold condition for the class of the streaming content that is specified as preferred in the user profile of the user, or for a certain triggering event of a change in a location of the user without using the mobile device; and setting the streaming content for multicasting upon detecting the triggering event, wherein the viewing behavior of the user including a direction to which the user faces in the viewing area while the streaming content is being played, eye movements by the user while watching the streaming content in the viewing area, hand or mouth movements by the user in the viewing area, and ambulatory movements by the user in and out of the viewing area, wherein the triggering event is a change in the viewing behavior by the user as being caused by a mobile device activity the user is engaged on the mobile device or any ambulatory movement of the user while carrying the mobile device away from the viewing area of the stationary device.

\* \* \* \* \*